C. C. Garrett.
Seed Planter.

Nº 31,381.

Patented Feb. 12, 1861.

Witnesses:
J. W. Coombs
R. S. Spencer

Inventor:
C C Garrett
per Munn & Co
Attorneys

UNITED STATES PATENT OFFICE.

C. C. GARRETT, OF SPRING HILL, ALABAMA.

IMPROVEMENT IN SEED-PLANTERS.

Specification forming part of Letters Patent No. 31,381, dated February 12, 1861.

*To all whom it may concern:*

Be it known that I, C. C. GARRETT, of Spring Hill, in the county of Marengo and State of Alabama, have invented a new and Improved Seed-Planter; and I do hereby declare that the following is a full, clear, and exact description of the same, reference being had to the annexed drawings, making a part of this specification, in which—

Figure 1:
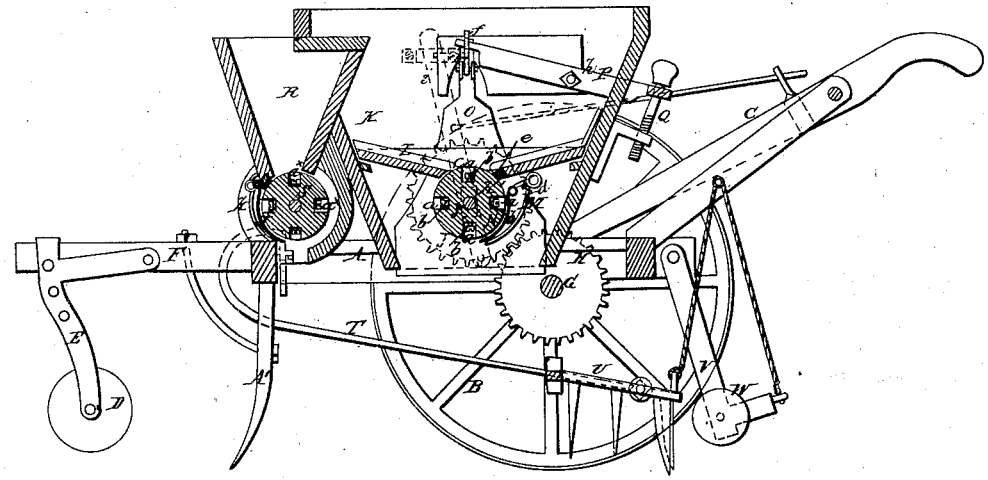
Figure 2:
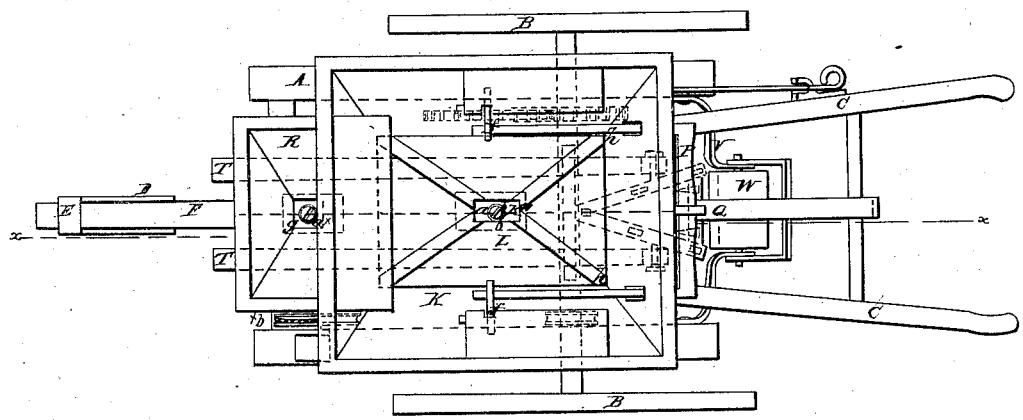

Figure 1 is a side sectional view of my invention, taken in the line $x\ x$, Fig. 1; Fig. 2, a plan or top view of the same.

Similar letters of reference indicate corresponding parts in the two figures.

The object of this invention is to obtain a machine by which corn may be planted alone or in connection with cotton-seed, as may be required.

Corn, as is well known, is frequently planted with cotton in the southern States, and hence a machine devised to plant both seeds simultaneously, or either separately, would be of considerable value in the cotton-producing section of the Union. In order to obtain this result I use a modification of a cotton-seed planter patented by me March 8, 1859, and employ in connection therewith a corn-planting device arranged substantially as hereinafter described.

To enable those skilled in the art to fully understand and construct my invention, I will proceed to describe it.

A represents a rectangular frame, which is mounted on wheels B B and provided with handles C C. The front part of the frame A is supported by a wheel, D, which is fitted in an adjustable yoke, E, attached to the front end of a bar, F, which projects from the frame A. The wheels B B are attached permanently to their axle G, which has toothed wheel H on it, said wheel gearing into a wheel, I, which is placed on a shaft, J, that passes through the lower part of a hopper, K, on the frame A. On the shaft J there is placed a wheel or cylinder, K', the periphery of which has holes $a$ made radially into it at equal distances apart. The bottoms of these holes $a$ are formed of screw-heads $b$, the screws passing radially into the wheel or cylinder. By turning these screws it will be seen that the capacity of the holes $a$ may be varied, as desired, as the heads $b$ of the screws may be adjusted nearer to or farther from the orifices of the holes $a$. (See Fig. 1.)

The bottom L of the hopper K is removable at pleasure. It is of slightly concave form, and has a rectangular opening, $c$, at its center, said opening being directly over the wheel or cylinder K'.

To the under side of the bottom L there is attached a spring, M, which bears against a concave, N, that is connected by a joint or hinge, $d$, to the bottom L, the spring M keeping the concave in contact with the back part of the wheel or cylinder K', the concave extending down to a point nearly underneath the shaft J. At the back side of the opening $c$ there is a brush, $e$, which bears against the periphery of the cylinder K'.

Within the hopper K and at each side there is placed a slide, $o$. These slides at their lower ends are equal in width to the length of the lower orifice of the hopper. The upper end of each slide $o$ is attached to a lever, $f$, the outer ends of which are attached to the inner end of a lever-frame, P, which has its fulcrum at $h\ h$. The frame P is adjusted by means of a screw, Q, which passes through its outer end at the outer side of the hopper, as shown clearly in Fig. 1.

One of the journals of the shaft J is fitted in a movable bar, $i$, so as to admit of the wheel I being thrown out of gear with the wheel H when desired.

To the front end of the hopper K there is attached a smaller hopper, R, at the bottom of which there is placed a cylinder, S. This cylinder S has holes $a^*$ in its periphery, and has a concave, $j$, pressed against it by a spring, $k$, and has also a brush, $b^*$, bearing against its periphery, the latter named parts being at the front side of cylinder S. This arrangement is substantially the same as that shown and described in the hopper K. The cylinder S is driven by a band from the axle G.

To the frame A two springs, T T, are attached. The front ends of these springs are bent in C form, and are attached to the frame by bolts passing into the frame through oblong slots in the springs, to render the latter adjustable in a vertical direction. To the back parts of these springs a harrow, U, is attached, the pressure of which on the ground may be regulated by adjusting the springs. To the back end of the frame A there is attached a swinging frame, V, which has a roller, W, in its lower end.

The operation is as follows: As the machine is drawn along the shaft J and wheel K' are rotated from the axle G by the gearing H I. When corn is to be planted alone the hopper K is supplied with it, hopper R being empty or supplied with such seeds as are planted with corn—such as pumpkin-seed, for instance. The wheel K' rotates in the direction indicated by arrow 1, and the seed is discharged from the holes $a$, the brush $e$ acting as a cut-off, and the concave N insuring the discharge of the seed from the cylinder at a point underneath the shaft J. The cylinder S may be of such diameter and made to rotate with such a speed relatively with cylinder K' that it may drop a proper number of seed compared with the dropping of cylinder K'. In case cotton-seed is to be sown alone, the bottom L is removed and the periphery of the cylinder K' supplied with teeth, as shown in my patent of March 8, 1859, and previously alluded to, the slides $o$ $o$ being raised or lowered by adjusting the frame P. This arrangement is the same as the patented one, and therefore need not be minutely described in this application. If corn is to be planted with cotton, the hopper R is supplied with it and the corn planted at proper intervals in the drills, the harrow and roller performing their usual functions. A proper furrow-share A' is attached to frame A.

I do not claim the adjustable slides $o$ $o$, for they have been previously used, and may be seen in my Letters Patent bearing date March 8, 1859; but I do claim as new and desire to secure by Letters Patent—

The arrangement of the shaft J, wheel K, cylinder S, gearing H I, hoppers K R, concave N, bottom L, spring M, slides $o$, lever-frames P, screws Q, springs T, harrows U, and frame A, all in the manner and for the purposes herein shown and described.

CHAS. C. GARRETT.

Witnesses:
GEO. O. GARRETT,
JOHN T. MASON.